United States Patent Office 3,145,200
Patented Aug. 18, 1964

3,145,200
STEROIDO[3.2-c]ISOXAZOLES AND
PREPARATION THEREOF
Raymond O. Clinton, East Greenbush, and Andrew John Manson, North Greenbush, N.Y., assignors to Sterling Drug Inc., New York, N.Y., a corporation of Delaware
No Drawing. Filed May 11, 1961, Ser. No. 109,274
10 Claims. (Cl. 260—239.55)

This invention relates to stereoido[3.2-c]isoxazoles, and in particular is concerned with androstano- and 4-androsteno[3.2-c]isoxazoles and the preparation thereof.

The compounds of the invention are of the formula

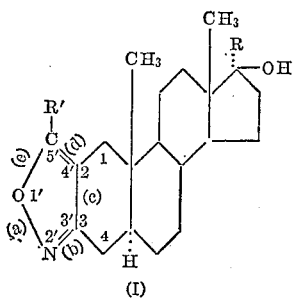

(I)

where R is hydrogen or an acyclic lower-hydrocarbon radical, and R' is hydrogen or amino. Also within the scope of the invention are the corresponding compounds having a double bond in the 4,5-position of the steroid nucleus, and 17-carboxylic acid esters of the foregoing steroids, the acyl moieties of said esters having from one to about ten carbon atoms and having a molecular weight less than about 200.

When R in the above formula is an acyclic lower-hydrocarbon group, it includes lower-alkyl, lower-alkenyl and lower-alkynyl groups having from one to about four carbon atoms and thus stands for such groups as methyl, ethyl, propyl, isopropyl, butyl, vinyl, 1-propenyl, 2-propenyl, 1-butenyl, ethynyl, propargyl, 1-propynyl, 1-butynyl, and the like.

The acyl moieties of the 17-carboxylic acid esters of compounds of the above formula are those conventionally employed in the steroid art. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenyol radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids, for instance, phosphoric acid, are also contemplated.

The compounds of the invention are prepared by three different methods as follows:

(A) By condensing a 2-hydroxymethylene-3-oxosteroid of the formula

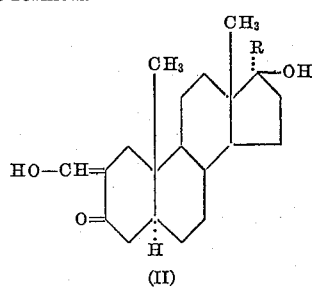

(II)

with hydroxylamine or an acid-addition salt thereof. The primary product of the reaction is a [2.3-d]isoxazole having the formula

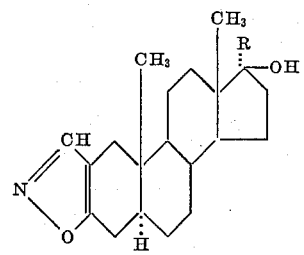

The compounds of the latter formula are disclosed and claimed in our copending application Serial No. 39,458, filed June 29, 1960, now U.S. Patent 3,135,743. We have discovered, however, that the [2.3-d]isoxazole is accompanied by a lesser amount of the isomeric [3.2-c]isoxazole produced by condensation in the reverse manner. The formation of the [3.2-c]isoxazole is favored by carrying out the condensation of the hydroxymethylene steroid and the hydroxylamine in a mildly alkaline medium. This condition is brought about by adding excess amounts of a salt of a strong base and a weak acid, such as sodium or potassium acetate, or a basic substance such as pyridine, to the reaction medium.

The [2.3-d]isoxazole and [3.2-c]isoxazole are separated by taking advantage of fundamental differences in their properties. The former is readily cleaved under strongly alkaline conditions to the corresponding 2α-cyano-3-oxosteroid, which is acidic in nature, whereas the [3.2-c]isoxazole is stable to alkali. Therefore, the latter can be isolated by treating the mixture with a strong base, such as sodium methoxide in methanol, and separating the neutral fraction.

(B) By condensing a 2α-cyano-3-oxo-steroid of the formula

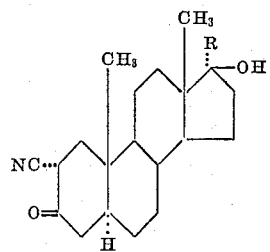

or a Δ⁴-unsaturated analog thereof with hydroxylamine or an acid-addition salt thereof. This produces a compound of formula I wherein R' is amino, or a Δ⁴-unsaturated analog thereof. The starting 2-cyano-3-oxo compounds are also disclosed in our copending application, Serial No. 39,458, filed June 29, 1960, now U.S. Patent 3,135,-743.

(C) By condensing a 2-lower-alkoxymethylene-3-oxo-steroid with hydroxylamine under basic conditions. The 2-lower-alkoxymethylene-3-oxo-steroids used as the starting materials are lower-alkyl ethers of the 2-hydroxymethylene-3-oxo-steroids used in method (A); and said ethers are prepared by treating the hydroxy-methylene compound with a lower-alkyl halide in the presence of an acid acceptor such as potassium carbonate, or by treating the hydroxymethylene compound with a lower-alkanol and a trace of acid. Pyridine-ethanol is a preferred medium for carrying out the condensation of the 2-lower-alkoxymethylene-3-oxo-steroid with hydroxylamine.

When the compounds of the above Formula I wherein R is lower-alkyl are heated in acidic medium, a dehydration-rearrangement reaction takes place which produces a 17-lower-alkyl-17-methyl-18-nor-12-androsteno[3.2-c]isoxazole.

Biological testing of the compounds of the invention has shown that they possess endocrinological properties. Among the activities demonstrated are myotrophic, anabolic, pituitary inhibiting, and steroid synthesis inhibiting properties.

The structure of the compounds was established by the mode of synthesis, their chemical properties (stability to base), their ultraviolet and infrared spectra, and by the fact that the values found upon elementary analysis corresponded with the values calculated for the assigned structures.

The following examples will further illustrate the invention without the latter being limited thereby.

EXAMPLE 1

*17β-Hydroxy-17α-Methylandrostano[3.2-c]Isoxazole*
[I; R is $CH_3$, R' is H]

A mixture of 6.18 g. (.0186 mole) of 2-hydroxy-methylene-17α-methylandrostan-17β-ol-3-one, 1.36 g. (.0195 mole) of hydroxylamine hydrochloride, 2.79 g. (.0205 mole) of sodium acetate trihydrate and 200 ml. of glacial acetic acid was refluxed for five minutes. The reaction mixture was concentrated to dryness in vacuo at 60° C., and the residue was extracted with ethyl acetate. The ethyl acetate extracts were washed with water, dried over anhydrous sodium sulfate and concentrated to dryness in vacuo. The residue was chromatographed on a column of 230 g. of silica gel, and the column was eluted with benzene and then with benzene-ether (19:1). The product thus eluted (5.39 g.) was recrystallized twice from ethyl acetate and then from acetone and ether to give 0.92 g. of 17β-hydroxy-17α-methylandrostano[2.3-d]isoxazole. The mother liquors were combined and concentrated, and the residue was treated with sodium methoxide (from 0.5 g. of sodium) in 60 ml. of absolute methanol and allowed to stand for three hours at room temperature. The reaction mixture was concentrated in vacuo to a volume of 30 ml., poured into 200 ml. of ethyl acetate and 200 ml. of 5% sodium hydroxide solution, and the mixture was shaken and filtered. The ethyl acetate layer from the filtrate was separated and washed with 5% sodium hydroxide solution and water. The alkaline washings were extracted with fresh ether, and the combined organic layers were dried over anhydrous sodium sulfate. The latter solution was concentrated in vacuo and the residue recrystallized several times from acetone and dried in vacuo at 70–80° C. for fourteen hours to give 17β-hydroxy-17α-methylandrostano[3.2-c]isoxazole in the form of colorless plates, M.P. 171.2–172.4° C. (corr.), $[\alpha]_D^{25}=+30.6°$ (1% in chloroform), ultraviolet maximum at 233mμ (E=3,700); infrared maxima at 2.98 and 6.24μ. A mixed melting point with the isomeric [2.3-d]isoxazole, M.P. 171.4–173.2° C. (corr.) showed a depression to 154–168° C.

EXAMPLE 2

*18-Nor-17,17-Dimethyl-12-Androsteno[3.2-c]Isoxazole*

17β - hydroxy - 17α - methylandrostano[3.2 - c]isoxazole (0.050 g.) was dissolved in 15 ml. of acetic acid. The solution was cooled to room temperature, 1 ml. of 3 N ethereal hydrogen chloride was added, and the mixture was refluxed for seven minutes. The reaction mixture was cooled, diluted with water, and the resulting precipitate collected by filtration, washed with water and dried. The resulting product (0.41 g.) was recrystallized twice from methanol and dried in vacuo at 65° C. for eight hours to give 18-nor-17,17-dimethyl-12-androsteno [3.2-c]isoxazole in the form of colorless needles, M.P. 115.0–116.8° C. (corr.), $[\alpha]_D^{25}=-11.4°$ (1% in chloroform). The infrared spectrum had a band at 7.37μ characteristic of a gem-dimethyl group.

EXAMPLE 3

*17β-Hydroxyandrostano[3.2-c]Isoxazole*
[I; R and R' are H]

Ethyl formate (200 ml.) was added to a stirred mixture of 100 g. of androstan-17β-ol-3-one and 27 g. of sodium methoxide in 1600 ml. of pyridine. The reaction mixture was stirred for one-half hour and allowed to stand at room temperature for about two days. Glacial acetic acid (36 g.) was then added, and the mixture was distilled in vacuo for nine hours to remove most of the solvent. Absolute ethanol (2 liters) was added and the solvent distilled off at reduced pressure. To the residue was added 28.8 g. of hydroxylamine hydrochloride and 2.25 liters of methanol, and the mixture was stirred and refluxed for three hours. The reaction mixture was concentrated to a volume of about 1.5 liters and added to 10 liters of water. The resulting precipitate, comprising a mixture of 17β-hydroxyandrostano[2.3-d]isoxazole and 17β-hydroxyandrostano[3.2-c]isoxazole was collected, washed with water and dried at 60° C. giving 110 g., M.P. 113–130° C. (uncorr.). The latter mixture was treated with sodium methoxide in methanol and the neutral fraction separated according to the manipulative procedure described above in Example 1. Said neutral fraction was recrystallized once from methanol and three times from ethyl acetate to give 17β-hydroxyandrostano[3.2-c]isoxazole in the form of colorless needles, M.P. 187.2–188.2° C. (corr.), ultraviolet maximum at 223mμ (E=3,800); infrared maxima at 2.97, 3.45, 6.23, 6.81 and 6.95μ. A mixed melting point with the isomeric [2.3-d]isoxazole, M.P. 179.8–182.0° C. (corr.) showed a depression to 178–183° C.

Similarly, 2-hydroxymethylene-17α-ethylandrostan-17β-ol - 3 - one, 2 - hydroxymethylene - 17α - propylandrostan - 17β - ol - 3 - one, 2-hydroxymethylene - 17α - isopropylandrostan - 17β - ol - 3 - one, 2 - hydroxymethylene - 17α - butylandrostan - 17β - ol - 3 - one, 2 - hydroxymethylene - 17α - vinylandrostan - 17β - ol - 3 - one, 2 - hydroxymethylene - 17α - ethynylandrostan - 17β - ol-3-one, or 2-hydroxymethylene-17α-propargylandrostan-17β-ol-3-one can be caused to react with hydroxylamine to give, respectively, 17β-hydroxy-17α-ethylandrostano [3.2-c]isoxazole [I; R is $C_2H_5$, R' is H], 17β-hydroxy-17α-propylandrostano[3.2-c]isoxazole [I; R is

R' is H], 17β-hydroxy - 17α - isopropylandrostano[3.2-c] isoxazole [I; R is $CH(CH_3)_2$, R' is H], 17β-hydroxy-17α-butylandrostano[3.2-c]isoxazole [I; R is

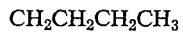

R' is H], 17β-hydroxy-17α-vinylandrostano[3.2-c]isoxazole [I; R is $CH=CH_2$, R' is H], 17β-hydroxy-17α-ethynylandrostano[3.2-c]isoxazole [I; R is $C\equiv CH$, R' is H], or 17β-hydroxy-17α-propargylandrostano[3.2-c]isoxazole [I; R is CH₂C≡CH, R' is H].

EXAMPLE 4

*17β-(β-Cyclopentylpropionoxy)Androstano[3.2-c]Isoxazole* [I; R and R' are H, β-Cyclopentylpropionate Ester]

β-Cyclopentylpropionyl chloride (6.0 g.) was added dropwise with swirling to a solution of 5.93 g. of 17β-hydroxyandrostano[3.2-c]isoxazole (Example 3) in 100 ml. of pyridine, and the solution was allowed to stand at room temperature for fifteen hours. The solution was then poured into ice water, and the mixture was extracted with ether-benzene (1:1). The ether extracts were washed with water, saturated sodium bicarbonate solution, water and saturated sodium chloride solution, and filtered through anhydrous sodium sulfate. The filtrate was concentrated in vacuo, and several portions of benzene were added and concentrated to remove residual water. The residue was chromatographed on 30 g. of silica gel, and the column was eluted first with benzene and then with benzene containing 5% ether. The crystalline fractions were combined and recrystallized several times from methanol to give 17β-(β-cyclopentylpropionoxy)androstano[3.2-c]isoxazole in the form of colorless needles, M.P. 153.9–156.0° C., ultraviolet maximum at 223mμ (E=3,900); infrared maxima at 3.44, 5.82, 6.22, 6.91 and 8.47μ.

Similarly, 17β-hydroxyandrostano[3.2-c]isoxazole can be caused to react with acetic anhydride, propionic anhydride, caproyl chloride, succinic anhydride, benzoyl chloride, p-nitrobenzoyl chloride, 3,4,5-trimethoxybenzoyl chloride, phenylacetyl chloride, cinnamoyl chloride, p-chlorophenoxyacetyl chloride, or β-cyclohexylpropionic anhydride, by heating in the presence of pyridine to give, respectively, 17β-acetoxyandrostano[3.2-c]-isoxazole,
17β-propionoxyandrostano[3,2-c]isoxazole,
17β-caproyloxyandrostano[3.2-c]isoxazole,
17β-(β-carboxypropionoxy)androstano[3.2-c]isoxazole,
17β-benzoyloxyandrostano[3.2-c]isoxazole,
17β-(p-nitrobenzoyloxy)androstano[3.2-c]isoxazole,
17β-(3,4,5-trimethoxybenzoyloxy)androstano
  [3.2-c]isoxazole,
17β-phenylacetoxyandrostano[3.2-c]isoxazole,
17β-cinnamoyloxyandrostano[3.2-c]isoxazole,
17β-(4-chlorophenoxyacetoxy)androstano
  [3.2-c]isoxazole, or
17β-(β-cyclohexylpropionoxy)androstano[3.2-c]
  isoxazole.

EXAMPLE 5

*17β-Hydroxy-17α-Methylandrostano[3.2-c]-5'-Aminoisoxazole* [I; R is CH₃, R' is NH₂]

To a warm solution of 2.00 g. of 2α-cyano-17α-methylandrostan-17β-ol-3-one in 200 ml. of tertiary-butyl alcohol and 200 ml. of methanol was added a solution of 0.444 g. of hydroxylamine hydrochloride and 0.592 g. of potassium acetate in 2–3 ml. of water. The reaction mixture was refluxed gently for six hours while concentrating it by distillation. Water was then added and the resulting precipitate collected by filtration. The solid product was recrystallized from acetone and from methonal and chromatographed on activated magnesium silicate (Florisil) using a small amount of methylene dichloride to place the material on the column. The column was eluted with benzene and benzene-ether (19:1); the latter solvent brought out the product which was recrystallized from acetone and from methanol and dried in vacuo at 100° C. for fourteen hours to give 17β-hydroxy-17α-methylandrostano[3.2-c]-5'-aminoisoxazole in the form of colorless needles, M.P. 253.8–255.0° C. (corr.), [α]$_D^{25}$=+21.4° (1% in ethanol), ultraviolet maximum at 253mμ (E=9,100); infrared maxima at 2.97, 3.18, 3.42, 6.07, 6.20, 6.66, 6.73, 6.91 and 6.99μ.

Similarly, 2α-cyanoandrostan-17β-ol-3-one, 2α-cyano-17α-ethylandrostan-17β-ol-3-one, 2α-cyano-17α-propylandrostan-17β-ol-3-one, 2α-cyano-17α-isopropylandrostan-17β-ol-3-one, 2α-cyano-17α-butylandrostan-17β-ol-3-one, or 2α-cyano-17α-methyl-4androsten-17β-ol-3-one can be caused to react with hydroxylamine to give, respectively, 17β-hydroxyandrostano[3.2-c]-5'-aminoisoxazole [I; R is H, R' is NH₂], 17β-hydroxy-17α-ethylandrostano[3.2-c]-5'-aminoisoxazole [I; R is C₂H₅, R' is NH₂], 17β-hydroxy-17α-propylandrostano[3.2-c]-5'-aminoisoxazole [I; R is CH₂CH₂CH₃, R' is NH₂], 17β-hydroxy-17α-isopropylandrostano[3.2-c]-5'-aminoisoxazole [I; R is CH(CH₃)₂, R' is NH₂], 17β-hydroxy-17α-butylandrostano[3.2-c]-5'-aminoisoxazole [I; R is CH₂CH₂CH₂CH₃, R' is NH₂], or 17β-hydroxy-17α-methyl-4-androsteno[3.2-c]-5'-aminoisoxazole [I; R is CH₃, R' is NH₂, double bond at C₄].

EXAMPLE 6

*17β-Hydroxy-17α-Methyl-4-Androsteno[3.2-c]Isoxazole* [I; R is CH₃, R' is H, double bond at C₄]

To a solution of 1.00 g. of 2-isopropoxymethylene-17α-methyl-4-androsten-17β-ol-3-one (M.P. 191.6–195.8° C., prepared from 2-hydroxymethylene-17α-methyl-4-androsten-17β-ol-3-one and isopropyl bromide in the presence of potassium carbonate) in 10 ml. of ethyl alcohol was added a solution of 0.50 g. of hydroxylamine hydrochloride in 2.5 ml. of pyridine. The mixture was refluxed gently for two hours, 100 ml. of ethyl acetate was added, and the solution was washed with water, dried over anhydrous sodium sulfate and concentrated to dryness in vacuo. The residue was recrystallized from an ether-hexane mixture containing a few drops of methanol to give 17β-hydroxy-17α-methyl-4-androsteno[3.2-c]isoxazole, M.P. 216–227° C. (uncorr.), ultraviolet maximum at 242mμ (E=12,500).

When measured by its effect upon the growth of the levator ani muscle in the rat, 17β-hydroxy-17α-methylandrostano[3.2-c]isoxazole (Example 1) was found to have a significant degree of myotrophic activity while demonstrating only slight androgenic activity at dose levels of 2.8 and 5.6 mg./kg. per day.

This application is a continuation-in-part of our co-pending application Serial No. 39,458, filed June 29, 1960, now U.S. Patent 3,135,743, which is in turn a continuation-in-part of our application Serial No. 750,289, filed July 23, 1958, now abandoned.

We claim:
1. A compound selected from the group consisting of (A) compounds of the formula

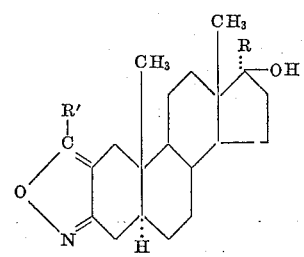

wherein R is a member of the group consisting of hydrogen and an acyclic lower-hydrocarbon radical, and R' is a member of the group consisting of hydrogen and amino; (B) compounds of the above formula having a double bond in the 4,5-position; and (C) 17-carboxylic acid esters of (A) and (B) the acyl moieties of said esters having from one to about ten carbon atoms and having a molecular weight less than about 200.

2. A compound of the formula:

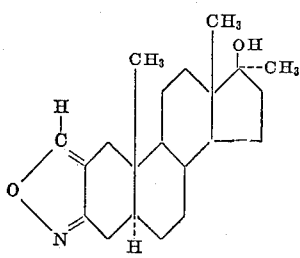

3. 18 - nor-17,17-dimethyl-12-androsteno[3.2-c]isoxazole.
4. 17β-hydroxyandrostano[3.2-c]isoxazole.
5. 17β - (β-cyclopentylpropionoxy)androstano[3.2-c]isoxazole.
6. 17β - hydroxy - 17α - methylandrostano[3.2-c]-5'-aminoisoxazole.
7. 17β - hydroxy-17α-methyl-4-androsteno[3.2-c]isoxazole.

8. A process for preparing a compound having the formula

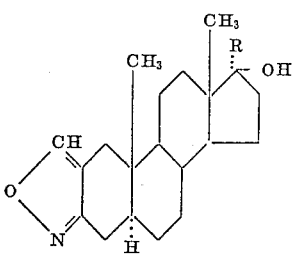

wherein R is a member of the group consisting of hydrogen and an acyclic lower-hydrocarbon radical, which comprises reacting a compound having the formula

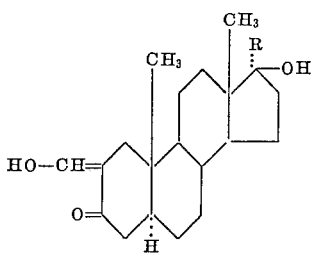

with hydroxylamine under mildly alkaline conditions, treating the resulting mixture with a strong base and separating the neutral fraction.

9. A process for preparing a compound selected from the group consisting of compounds having the formula

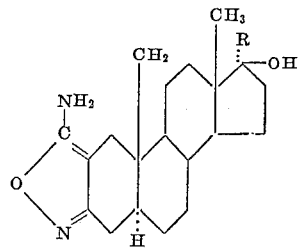

and compounds corresponding to the above formula but having a double bond in the 4,5-position, which comprises reacting with hydroxylamine a compound selected from the group consisting of compounds having the formula

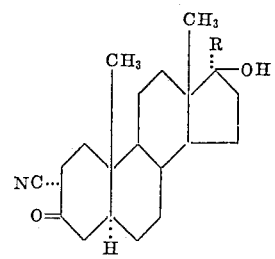

and compounds corresponding to the immediately above formula but having a double bond in the 4,5-position, wherein R is a member of the group consisting of hydrogen and an acyclic lower-hydrocarbon radical.

10. A process for preparing a compound selected from the group consisting of compounds having the formula

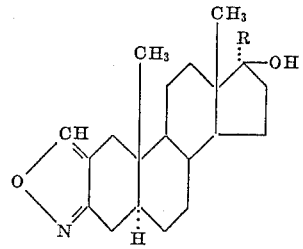

and compounds corresponding to the above formula but having a double bond in the 4,5-position, which comprises reacting with hydroxylamine under mildly alkaline conditions a compound selected from the group consisting of compounds having the formula

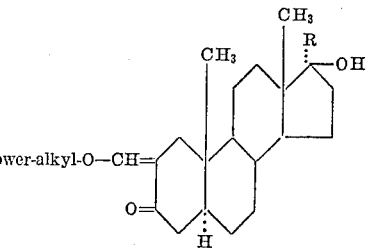

and compounds corresponding to the immediately above formula but having a double bond in the 4,5-position, where R is a member of the group consisting of hydrogen and an acyclic lower-hydrocarbon radical.

No references cited.